United States Patent
Padilla et al.

(10) Patent No.: US 8,817,433 B2
(45) Date of Patent: Aug. 26, 2014

(54) ELECTROSTATIC DISCHARGE PROTECTION DEVICE HAVING AN INTERMEDIATE VOLTAGE SUPPLY FOR LIMITING VOLTAGE STRESS ON COMPONENTS

(75) Inventors: Thierry Padilla, Claix (FR); Fabrice Blanc, Vinay (FR); Jean-Claude Duby, Saint Egreve (FR)

(73) Assignee: ARM Limited, Cambridge (GB)

( * ) Notice: Subject to any disclaimer, the term of this patent is extended or adjusted under 35 U.S.C. 154(b) by 391 days.

(21) Appl. No.: 13/137,225

(22) Filed: Jul. 28, 2011

(65) Prior Publication Data

US 2013/0027820 A1   Jan. 31, 2013

(51) Int. Cl.
*H02H 1/00* (2006.01)
(52) U.S. Cl.
USPC .......................................................... 361/56
(58) Field of Classification Search
CPC ........................................................ H02H 1/00
USPC .............................. 361/56, 57, 58
See application file for complete search history.

(56) References Cited

U.S. PATENT DOCUMENTS

| 2005/0041346 | A1* | 2/2005 | Wu et al. ..................... 361/56 |
| 2005/0259373 | A1* | 11/2005 | Hoopes ....................... 361/90 |
| 2007/0230073 | A1* | 10/2007 | Ker et al. .................... 361/56 |
| 2008/0062596 | A1  | 3/2008 | Miller et al. |
| 2008/0316663 | A1* | 12/2008 | Martin et al. ................ 361/56 |
| 2010/0027173 | A1* | 2/2010 | Wijmeersch ................ 361/56 |
| 2012/0243133 | A1* | 9/2012 | Wu .............................. 361/56 |

\* cited by examiner

*Primary Examiner* — Rexford Barnie
*Assistant Examiner* — Angela Brooks
(74) *Attorney, Agent, or Firm* — Nixon & Vanderhye P.C.

(57) ABSTRACT

An electrostatic protection apparatus is disclosed that has a voltage level supply configured to supply a voltage level to an electrostatic discharge protection device and the electrostatic discharge protection device that protects a semiconductor electronic device from a rapidly increasing incoming current. The voltage level supply comprises: a voltage divider arranged between high and low voltage rails for supplying an intermediate voltage level to the electrostatic protection device such that a voltage drop across at least some devices within the electrostatic protection device is limited by the intermediate voltage level; a detection device for detecting a signal received from said electrostatic discharge protection device indicating the electrostatic discharge protection device has received the rapidly increasing incoming current; a switching device responsive to the signal to switch the voltage level supplied to the electrostatic discharge protection device from the intermediate voltage level to a voltage level of one of the voltage rails.

20 Claims, 7 Drawing Sheets

ELECTROSTATIC DISCHARGE PROTECTION DEVICE HAVING AN INTERMEDIATE VOLTAGE SUPPLY FOR LIMITING VOLTAGE STRESS ON COMPONENTS

BACKGROUND

The field of the invention relates to the field of electrostatic discharge protection for semiconductor electronic circuits.

Electrostatic protection devices ESDs such as RC-triggered devices that use the conductance properties of a capacitor to switch these protection devices on in response to rapidly changing voltage levels are known. Electrostatic discharge occurs when, for example, a body with a high capacitance touches a circuit and the stored charge in the body is transmitted to the circuit resulting in a rapidly increasing incoming current. This can lead to high voltage changes within the circuit unless the current can be dissipated. If too high a voltage is allowed to manifest itself across an electronic device it may cause breakdown and damage to that device.

Various ESDs have been devised that are responsive to rapidly increasing incoming currents and allow a current to flow through low resistance devices, thereby dissipating the current and reducing any voltage peaks to levels that are not high enough to damage component devices.

FIG. 1a shows an RC-triggered ESD device according to the prior art. This device uses the resistance properties of a capacitor, which are high in a steady state and low when voltages are rapidly changing, to turn the large MOS device on in response to a rapidly changing voltage level and off when the device is in a steady state. Turning the big MOS device on allows a current to flow and a peak voltage level can be dissipated. As the voltage peak relaxes the voltage level stops changing so rapidly and the capacitor stops conducting and will start to charge and the big MOS will turn off and the low resistance path will disappear.

In semiconductor devices it is becoming more common to address different voltage domains without additional mask costs where possible and for this reason input/output circuits often use MOS devices with voltage stress tolerances that are lower than the power supply level, for example 1.8V gate oxide MOS devices might be used with input/output cells supplied at 2.5V.

In such cases care must be taken not to over stress the devices and thereby degrade or permanently damage them. One way of addressing this potential problem is to provide cascaded structures where the devices are arranged in series between the power rails and intermediate power levels are applied to appropriate nodes in order to limit over-voltages. FIG. 1b shows an electrostatic protection device similar to that of FIG. 1a where the devices are formed from 1.8V gate oxide devices and are supplied with an intermediate voltage generated by a voltage divider.

SUMMARY

A first aspect of the present invention provides an electrostatic protection apparatus comprising a voltage level supply configured to supply a voltage level to an electrostatic discharge protection device and said electrostatic discharge protection device for protecting a semiconductor electronic device from a rapidly increasing incoming current, said voltage level supply comprising: a voltage divider arranged between high and low voltage rails for supplying an intermediate voltage level between said high and low voltage levels to said electrostatic protection device such that a voltage drop across at least some devices within said electrostatic protection device is limited by said intermediate voltage level; a detection device for detecting a signal received from said electrostatic discharge protection device indicating said electrostatic discharge protection device has received said rapidly increasing incoming current; a switching device responsive to said signal to switch said voltage level supplied to said electrostatic discharge protection device from said intermediate voltage level to a voltage level of one of said voltage rails.

The present invention recognises that an intermediate voltage level may be required where devices in an electronic circuit have voltage stress tolerance levels that are lower than the power supply level. However, in an electrostatic discharge protection device, where it is important that large amounts of current can be dissipated quickly, it may be advantageous to be able to supply an increased voltage during the limited time period that these currents are being dissipated. This may allow an increased performance during these very short time periods, where such an increased performance is important without damaging the components.

Thus, an electrostatic discharge device can be provided that can operate under steady state conditions with an intermediate voltage level supplied to it, such that its components can be formed of devices with lower voltage stress tolerances than the voltage level provided by the high and low voltage rails. This ESD is however, responsive to a rapidly increasing current to receive the higher voltage levels and yet due to the short time periods during which this occurs the devices will not be damaged but will operate at increased performance levels allowing a large current to be dissipated.

In some embodiments, said detection device is configured to detect a further signal received from said electrostatic protection device indicating that said rapidly increasing incoming current has been dissipated to an extent such that said incoming current is no longer high enough to damage devices within said semiconductor electronic circuit; said switching device being responsive to said further signal to switch said voltage level supplied to said electrostatic discharge protection device from said voltage level of said one of said voltage rails to said intermediate voltage level.

The increased voltage levels applied from the voltage rails are required when the rapidly increasing incoming current needs to be dissipated quickly. Once it has been dissipated sufficiently such that it is no longer high enough to damage devices within the semiconductor electronic circuit, then it is advantageous if the switching device switches the voltage level supplied to the electrostatic discharge protection device back to the intermediate voltage level. It should be noted that the point at which it switches back will depend upon the components of the circuit being protected and upon the voltage levels of the voltage rails. The skilled person would be able to determine an incoming current level that would not cause voltage differences that might damage the semiconductor electronic circuit being protected and would set the detection devices to detect this level such that the switching device switches at the appropriate point.

In some embodiments, said voltage divider comprises a voltage divider switch providing a low resistance path when switched on and a high resistance path when switched off, said voltage divider switch being configured to switch off in response to said detection device detecting receipt of said signal and to switch on in response to said detection device detecting receipt of said further signal.

It is advantageous if the voltage divider that supplies the intermediate voltage level can be switched off when the voltage level of the voltage rail is being supplied to the circuit. This stops any competition between the voltage divider supplying the intermediate voltage to a node and the voltage rail supplying a voltage level of the voltage rail to the same node.

In some embodiments, said electrostatic device is responsive to said rapidly increasing incoming current to protect said semiconductor electronic circuit by providing a low resistance path between a high voltage rail and a low voltage rail to thereby dissipate said incoming current, said electrostatic discharge protection device comprising: two discharge devices arranged in series between said high voltage rail and said low voltage rail, said two discharge devices providing said low resistance path when both are switched on and providing a high resistance path when at least one of said two discharge devices is switched off, said two discharge devices each comprising a control node and each being responsive to a voltage at said control node to switch on or off; wherein said voltage level supply is configured to supply said voltage level to said control node of a first of said two discharge devices.

The electrostatic discharge protection device may be formed of two discharge devices which provide a low resistance path when switched on between the two voltage rails allowing incoming current to dissipate quickly. At least one of these discharge devices should be switched off in normal operation and they should both be switched on very quickly in response to a rapidly increasing incoming current. It is advantageous if the voltage level supply supplies the voltage level to the control node of one of the two discharge devices. In this way, during normal operation the voltage drop across the two discharge devices is limited by the intermediate voltage level at one of the control nodes of the two devices. This avoids the complete voltage difference between the two voltage rails falling across one of the devices and possibly damaging it. It should be noted that two discharge devices arranged in series are used where these discharge devices are not designed to operate at the voltage levels of the voltage rails and they are arranged in this way such that the voltage level drop between the two voltage rails is shared across the devices. Having the intermediate voltage at a control node of one of the devices ensures that the voltage level drop across each device is limited.

In some embodiments, said two discharge devices are arranged such that in response to said voltage level supply supplying said voltage level of said one of said voltage rails to said control node of said first discharge device, said control node of said second discharge device is connected to said control node of said first discharge device, such that said control nodes of said two discharge devices receive said voltage level from said one of said voltage rails and said two discharge devices are switched on.

When a rapidly increasing incoming current is detected the voltage level supply supplies a voltage level of one of the voltage rails to the control node of the first discharge device. One of the problems of supplying an intermediate level voltage to the control node of this device is that the amount of current that can pass through this device is limited by this intermediate voltage level. During an electrostatic discharge event the discharge devices need to be able to transmit a lot of current very quickly. Thus, it is advantageous if in response to such an event the voltage level supplied to the control node of the discharge devices is increased to the voltage level of one of the voltage rails. Thus, in response to such a discharge event the voltage level supplies the voltage level of the rails rather than the intermediate voltage level to a control node of one of the discharge devices and the control node of the other of the two discharge devices is connected to the control node of the first discharge device, thereby increasing the current capacity of the path formed by the two devices.

In some embodiments, said two discharge devices are arranged such that in response to said voltage level supply supplying said intermediate voltage level to said control node of said first discharge device, said second discharge device receives a voltage level close to a voltage level of an other voltage rail to said one of said voltage rails and is switched off.

During steady state operation where no electrostatic discharge event has occurred, one of the discharge devices should be switched off and thus, it is convenient if the second discharge device is switched off and the first discharge device receives the intermediate voltage level at its control node. It should be noted that first and second are used to differentiate the two discharge devices from each other and that either discharge device could be the first or the second device.

In some embodiments, said electrostatic discharge protection device comprises at least one further discharge device arranged in series with said two discharge devices, said at least one further discharge device having a control node connected to a control node of said first or said second discharge device.

Although there may be two discharge devices arranged in series, it should be clear to a skilled person that additional discharge devices could be arranged in series with these two discharge devices with control nodes connected together such that they switch on and off in line with the other discharge devices.

In some embodiments, said electrostatic protection device comprises: a trigger device arranged between a first of said voltage rails and an internal node of said electrostatic discharge protection device, said trigger device providing a high resistance path in response to a steady voltage difference across said trigger device and providing a low resistance path in response to a rapidly changing voltage difference across said trigger device caused by said rapidly changing incoming current, such that in response to said rapidly changing voltage difference said internal node attains a voltage level close to said voltage level of said first voltage rail, said detecting device detecting said voltage level of said internal node attaining a voltage level close to said voltage level of said first voltage rail as said signal.

One way of generating the signal that is detected by the detecting device is by using a trigger device whose resistance varies with rapidly changing voltage differences. If such a device is connected to a particular node the rapidly changing voltage level will change its resistance and this will affect the voltage at this node. The detecting device can then detect the voltage level change at this node and this will be a good indication that a rapidly increasing incoming current has been received.

In some embodiments, said internal node is connected via a resistor to a second of said voltage rails, wherein in response to said rapidly changing voltage level attaining a steadier value, a resistance of said trigger device rises, and said voltage level of said internal node moves towards a voltage level of said second of said voltage rails; said detecting device being configured to detect said voltage level of said internal node changing from said voltage level close to said voltage level of said first voltage rail towards a voltage level of said second voltage rail as a further signal and in response to said further signal said switching device is configured to switch said voltage level supplied to said electrostatic protection device from said high voltage rail to said intermediate voltage level; and wherein said trigger device, resistor and said switching device lie between said two voltage rails, said switching device switching off in response to said further signal such that said trigger device and said resistor are isolated from said one of said voltage rails.

An arrangement where the trigger device, a resistor and the switching device are arranged between the two voltage rails may be convenient. In such a case, the switching device can disconnect the voltage rail from the resistor and trigger device when the intermediate voltage level is supplied to the electrostatic discharge device and this will mean that the resistor and capacitor are no longer connected between the two voltage rails. As this occurs during normal operation it will avoid the higher voltage level falling across the trigger device when it is not conducting which will avoid it being degraded by this larger voltage drop.

In some embodiments, said electrostatic device is responsive to a rapidly increasing incoming current to protect a semiconductor electronic circuit by providing a low resistance path between a high voltage rail and a low voltage rail to thereby dissipate said incoming current, said electrostatic discharge protection device comprising: two discharge devices arranged in series between said high voltage rail and said low voltage rail, said two discharge devices providing said low resistance path when both are switched on and providing a high resistance path when at least one of said two discharge devices is switched off, said two discharge devices each comprising a control node and each being responsive to a voltage at said control node to switch on or off; wherein said voltage level supply is configured to supply said voltage level to said control node of a first of said two discharge devices; and said second discharge device is responsive to a voltage level at said internal node and in response to said voltage level moving towards a voltage level of said second voltage rail said second of said two discharge devices is configured to switch off.

The use of the trigger device to change a voltage level at an internal node in response to rapidly changing incoming current can be used as a control signal for the second discharge device such that it switches off in response to the voltage level moving towards a voltage level of the second voltage rail indicating that the rapidly increasing incoming current has been dissipated. The point at which it switches can be selected to be a point at which it is judged that the current, has been dissipated to a sufficient amount to protect the devices within the semiconductor electronic device.

In some embodiments, said two discharge devices are NMOS transistors, said first voltage rail is said low voltage rail and said one of said voltage rails and said second voltage rail are said high voltage rail and said control node of said second discharge device is connected to said internal node via an inverting device.

Although the discharge devices may be formed of various materials, it may be advantageous for them to be NMOS transistors. If this is the case then the low voltage rail will be the first voltage rail and the second voltage rail and the one of the voltage rails that supplies a voltage to the electrostatic discharge protection device in place of the intermediate voltage level during an electrostatic discharge event is the high voltage rail. NMOS transistors are generally smaller than PMOS transistors and as discharge devices need to be large in order to transmit a lot of current quickly, it may be advantageous to form the discharge devices out of NMOS transistors.

In some embodiments, said inverting device is powered between said voltage level supplied from said voltage level supply and said low voltage rail.

It may be advantageous to protect the inverting device from the high voltage levels by using the intermediate voltage level to power the inverting device during normal operation.

In some embodiments, said inverting device comprises a switching device between said control node of said first discharge device and a control node of said second discharge device, said switching device being responsive to said internal node attaining a voltage level close to said voltage level of said first voltage rail to switch on and connect said two control nodes to each other.

As noted previously, it is advantageous if when the voltage level of the voltage rail is supplied to the electrostatic protection device it is supplied to the control nodes of both discharge devices such that both discharge devices operate with an increased current capacity. It may be advantageous if the switching devices within the inverter are used to connect the two control nodes in response to the internal nodes obtaining a voltage level close to the voltage level of the first voltage rail.

Although the trigger device may be formed in a number of ways, a capacitor forms a low area inexpensive trigger device.

Although it may be advantageous in some cases to form the discharge devices from NMOS transistors, they may also be formed from PMOS transistors. In such a case then the first voltage rail will be the high voltage rail, the second voltage rail and the one of the voltage rails that the voltage supply device supplies to the electrostatic discharge device in place of the intermediate voltage level will be the low voltage rail.

A second aspect of the present invention provides a method of supplying a voltage level to an electrostatic protection device for protecting a semiconductor electronic device powered by voltage rails at respective high and low voltage levels from a rapidly increasing incoming current, said method comprising: supplying an intermediate voltage level between a high and low voltage level to said electrostatic protection device such that a voltage drop across at least some devices within said electrostatic protection device is limited by said intermediate voltage level; detecting a signal received from said electrostatic discharge protection device indicating said electrostatic discharge protection device has received said rapidly increasing incoming current; switching said voltage level supplied to said electrostatic discharge protection device from said intermediate voltage level to a voltage level of one of said voltage rails.

A third aspect of the present invention provides an electrostatic protection apparatus comprising a voltage level supply means for supplying a voltage level to an electrostatic discharge protection means and said electrostatic discharge protection means for protecting a semiconductor electronic device from a rapidly increasing incoming current, said voltage level supply means comprising: a voltage dividing means arranged between high and low voltage rails for supplying an intermediate voltage level between said high and low voltage levels to said electrostatic protection means such that a voltage drop across at least some devices within said electrostatic protection means is limited by said intermediate voltage level; a detection means for detecting a signal received from said electrostatic discharge protection means indicating said electrostatic discharge protection means has received said rapidly increasing incoming current; a switching means responsive to said signal for switching said voltage level supplied to said electrostatic discharge protection device from said intermediate voltage level to a voltage level of one of said voltage rails.

The above, and other objects, features and advantages of this invention will be apparent from the following detailed description of illustrative embodiments which is to be read in connection with the accompanying drawings.

DESCRIPTION OF NON-LIMITING EXAMPLE

Figure 1A:
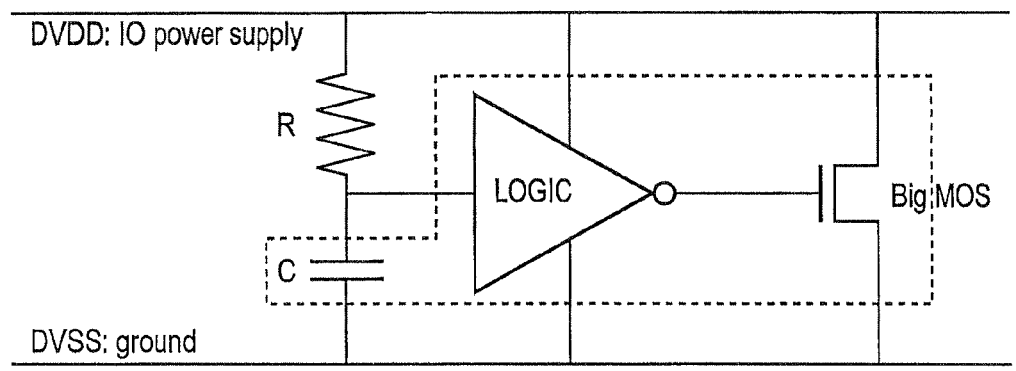
FIG. 1a shows a electrostatic discharge protection device according to the prior art.
Figure 1B:
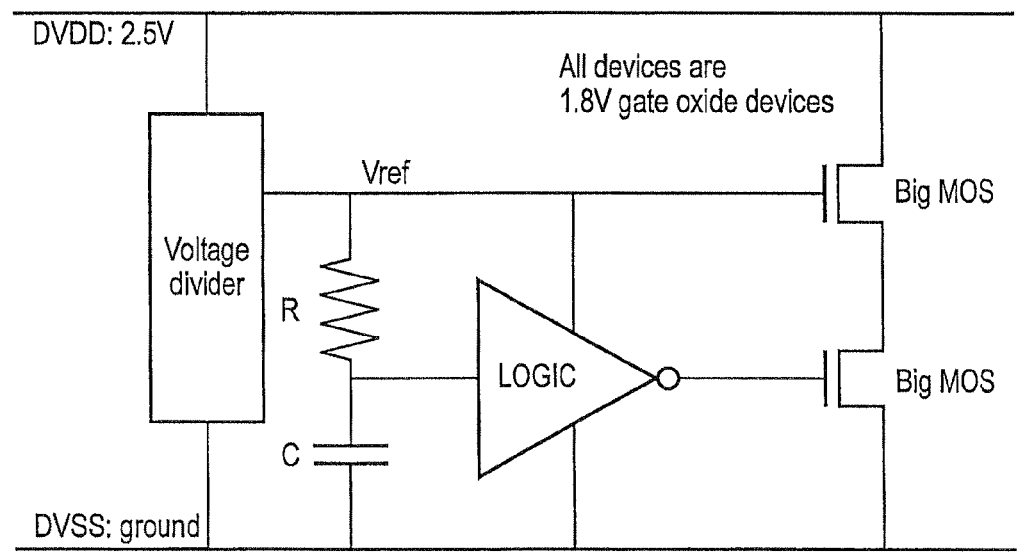
FIG. 1b shows an electrostatic protection device with a voltage divider for providing voltage stress limitation according to the prior art.
Figure 2:
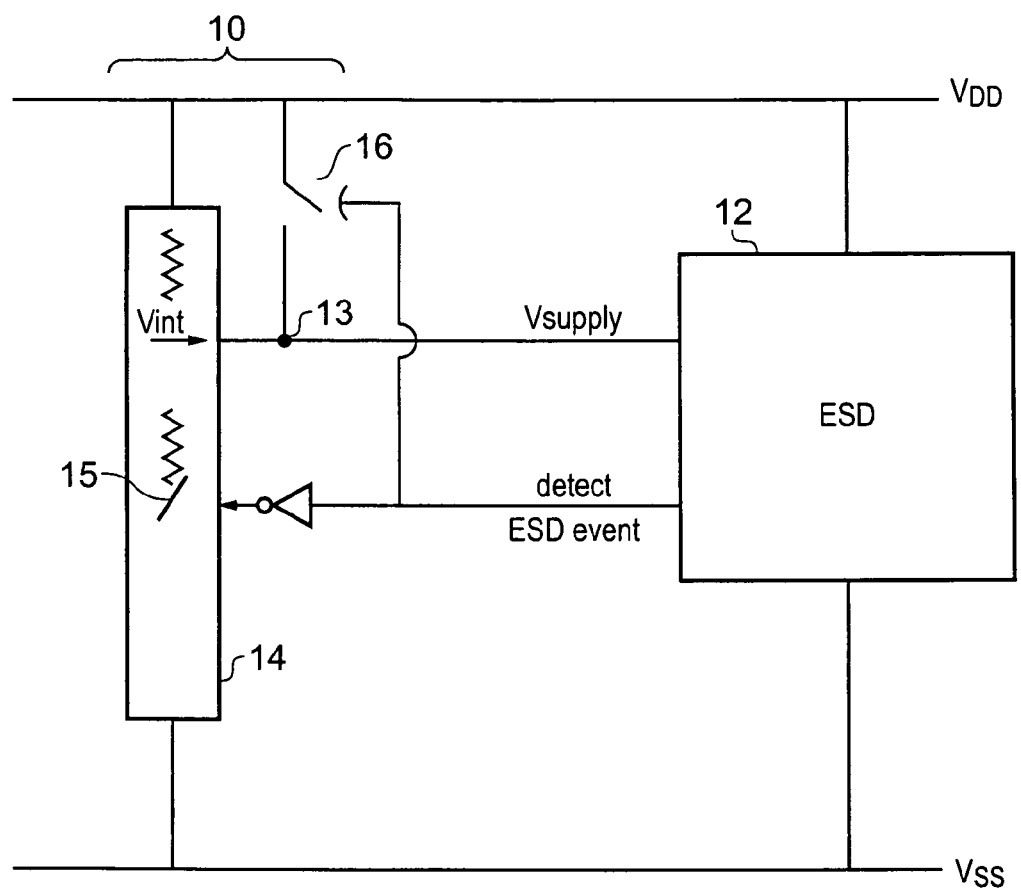
FIG. 2 shows a voltage supply device for an electrostatic discharge protection device according to an embodiment of the present invention.

FIG. 2 shows very schematically how a voltage supply 10 supplies either a high voltage level VDD to an electrostatic discharge device 12 or supplies an intermediate voltage level $V_{int}$ to the ESD 12 via a voltage supply node 13.

The voltage supply device 10 comprises a voltage divider 14 that comprises a conventional voltage divider having a switch 15 and it also comprises a further switch 16.

The ESD 12 is configured to output a detection signal when it detects rapidly increasing incoming current signalling an ESD event. This increasing current may be detected in a number of ways which will be described later. In response to this detection signal, switch 15 is opened so that the voltage divider is no longer supplying an intermediate voltage level $V_{int}$ to the voltage supply node 13 and the switch 16 is closed or switched on so that the high voltage level rail VDD is connected to the voltage supply node 13 supplying a voltage level VDD to the ESD 12.

When ESD 12 detects that the rapidly increasing incoming current has been dissipated such that it has fallen below a level at which the components of the electronic device being protected are likely to be damaged, then a further signal is emitted by the ESD 12 and in response to this switch 15 is closed or switched on so that the voltage divider is once more operational and supplies an intermediate voltage level via the voltage supply node 13 to ESD 12 and switch 16 is switched off such that the high voltage rail is isolated from voltage supply node 13.

Figure 3:
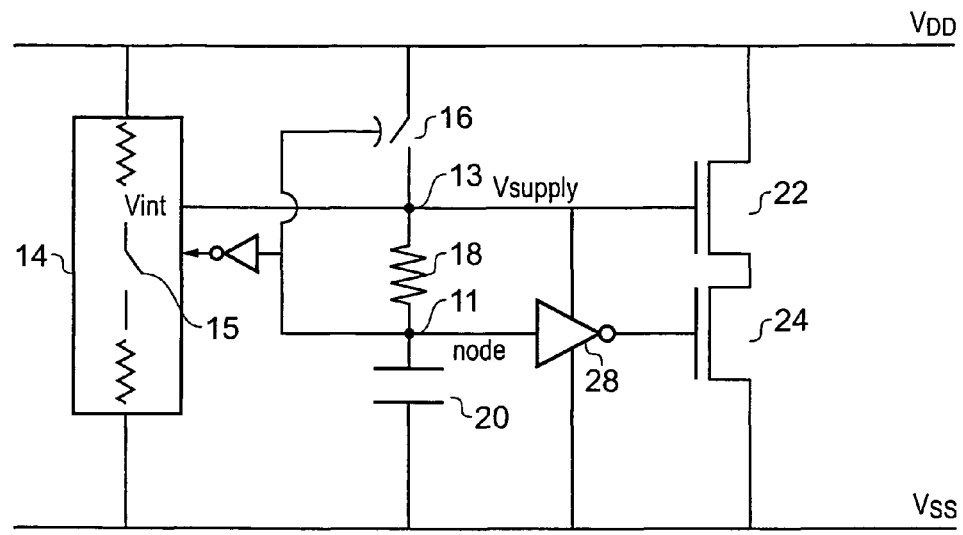
FIG. 3 shows an electrostatic protection apparatus according to an embodiment of the present invention.

FIG. 3 schematically shows an electrostatic protection apparatus according to an embodiment of the present invention. This apparatus comprises voltage divider 14 with switch 15. As in the apparatus of FIG. 2, that apparatus of FIG. 3 comprises switch 16 for connecting the input voltage supply node 13 to the high voltage rail VDD or isolating it from VDD and it comprises a resistor 18 and capacitor 20. It also comprises two discharge devices 22 and 24 which in this embodiment are large NMOS transistors. These are located between the high and low voltage rails and form a low resistance path when switched on. During normal operation one of these devices is switched off such that the low resistance path is not present, however in response to an ESD event they are both switched on such that the rapidly increasing incoming current can be dissipated by flowing between the rails.

In this embodiment the second of the two discharge devices 24 is switched off during normal operation and the first of the two discharge devices 22 receives the intermediate voltage level at its gate. The supply of an intermediate voltage level to the gate of discharge device 22 prevents the full voltage difference from VDD to VSS falling across either one of the two discharge devices. In this way, discharges devices that have lower voltage stress tolerances than the supply voltages can be used as in normal steady state operation they are protected by this intermediate voltage level supply. However, when an ESD event is detected it is advantageous if these devices are able to transmit as much current as possible. If the voltage level at the gate of these devices is increased then they can transmit more current. Therefore, in this apparatus in response to the electrostatic discharge event being detected the switch 16 is switched on and switch 15 is switched off such that the voltage level supplied to discharge device 22 is not the intermediate voltage $V_{int}$ but is the voltage level of the high voltage rail VDD. The voltage level of the high voltage rail VDD is also supplied to the gate of transistor 24 via inverter 28. This will be described in more detail with respect to FIG. 4.

The operation of the apparatus of FIG. 3 will now be described. During steady state operation when the voltage level on the voltage rails is constant capacitor 20 is charged and the internal node 11 is at the same voltage as the current supply voltage that is the intermediate voltage $V_{int}$ supplied by the voltage divider 14. This voltage level is sufficient for discharge device 22 to be switched on and due to inverter 28 discharge device 24 is switched off and the electrostatic discharge protection device does not transmit current.

When an electrostatic discharge event occurs then a rapidly increasing current is received and voltage levels within the circuit change rapidly. The capacitor 20 does not conduct steady voltages but has a very high conductance to rapidly changing voltages. Thus, capacitor 20 moves into a conductive state and the voltage at internal node 11 drops towards VSS. This voltage drop is used as a control signal to control switches 15 and 16. Switch 15 switches off in response to the voltage at internal node 11 being low and switch 16 switches on. Thus, the voltage level at the gate of discharge device 22 attains the voltage level of the high voltage rail and a similar voltage is connected to discharge device 24 via inverter 28. Thus, the two discharge devices are fully switched on and can conduct a significant amount of current.

Once the rapidly increasing incoming current has been dissipated via these discharge devices 22, 24 the voltage level no longer changes rapidly and capacitor 20 starts to have a higher resistance and therefore charge. This raises the voltage level at the internal node 11 and this switches switch 15 on and switch 16 off. Thus, the voltage supply to the gate of the discharge device 22 returns to the intermediate voltage and the voltage level supplied to the gate of discharge device 24 will be a low voltage being inverted by inverter 28 and thus, discharge device 24 turns off and a current is no longer conducted through these devices.

The size of resistor 18 and capacitor 11 can be selected so that the switches 15 and 16 switch at an appropriate current level that protects the electronic semiconductor circuit.

Figure 4:
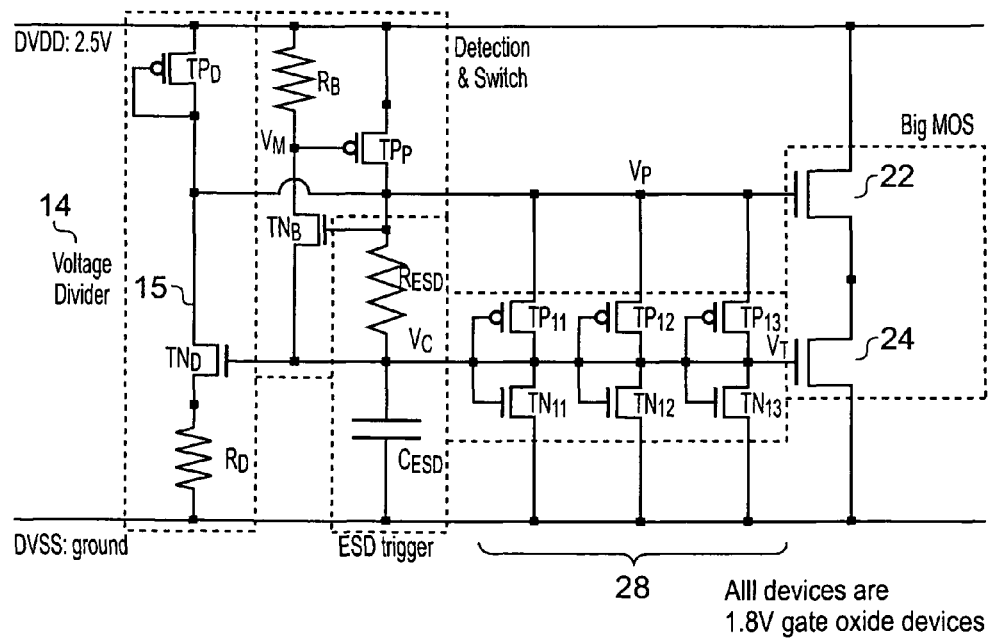
FIG. 4 shows in more detail an electrostatic protection apparatus according to an embodiment of the present invention.

FIG. 4 shows a similar apparatus in more detail. In this example 1.8V gate oxide devices are used in a 2.5V power supply environment. As would be clear to a skilled person this is simply an example and embodiments of the invention can be extended to other combinations of gate oxide devices and power supply levels with appropriate design.

In this apparatus voltage divider 14 is formed of transistor $TP_D$ connected in diode mode, a switch 15 in the form of a transistor $TN_D$ and a resistor $R_D$. The inverter 28 is shown as three inverters arranged as a chain of inverters. As noted previously the discharge devices 22 and 24 need to be large devices to conduct a lot of current. They therefore have a large capacitance and thus, the current required to switch them on is relatively high. For this reason, in this embodiment there are three inverters 28 arranged in parallel so that they are able to provide the required current.

The operation of the electrostatic protection apparatus of FIG. 4 will first be described during steady state normal operation when no ESD event has occurred.

When turned on during power ramp-up: $V_C=V_P$ through $R_{ESD}$ and $TN_B$ is therefore off. Then as DVDD ramps up on the high voltage rail, as $TN_B$ is off $V_M$ follows the ramping up of DVDD through $R_B$ and $TP_P$ corresponding to switch 16 of FIG. 3 is therefore off. The voltage level $V_P$ which controls the gate of discharge device 22 is also controlled by $TP_D$ and follows DVDD while $TN_D$ is off. As soon as $V_C$ rises above the threshold of $TN_D$, $TN_D$ turns on and the voltage divider 14 starts to operate. At this point $V_P$ becomes the intermediate voltage $V_{int}$ supplied to the electrostatic protection discharge device and is defined by the ratio of $R_D$ and the [drain-source] resistance of $TP_D$. The ratio is designed such that the intermediate voltage $V_{int}$ does not rise above the maximum voltage acceptable on 1.8V gate oxide devices (1.95V) in any case.

When the voltage on the high voltage rail DVDD has reached its final value. $V_{int}$ is set at an appropriate value to avoid any stress on the devices powered by this voltage level (max value: 1.95V), $V_C=V_P$, and $V_T=0$, thus, the Big MOS 24 is off. Note that there is some inevitable DC consumption in the line constituted by $R_D$, $TN_D$ and $TP_D$. The design constraints can be done in order to limit this DC consumption.

Figure 5:
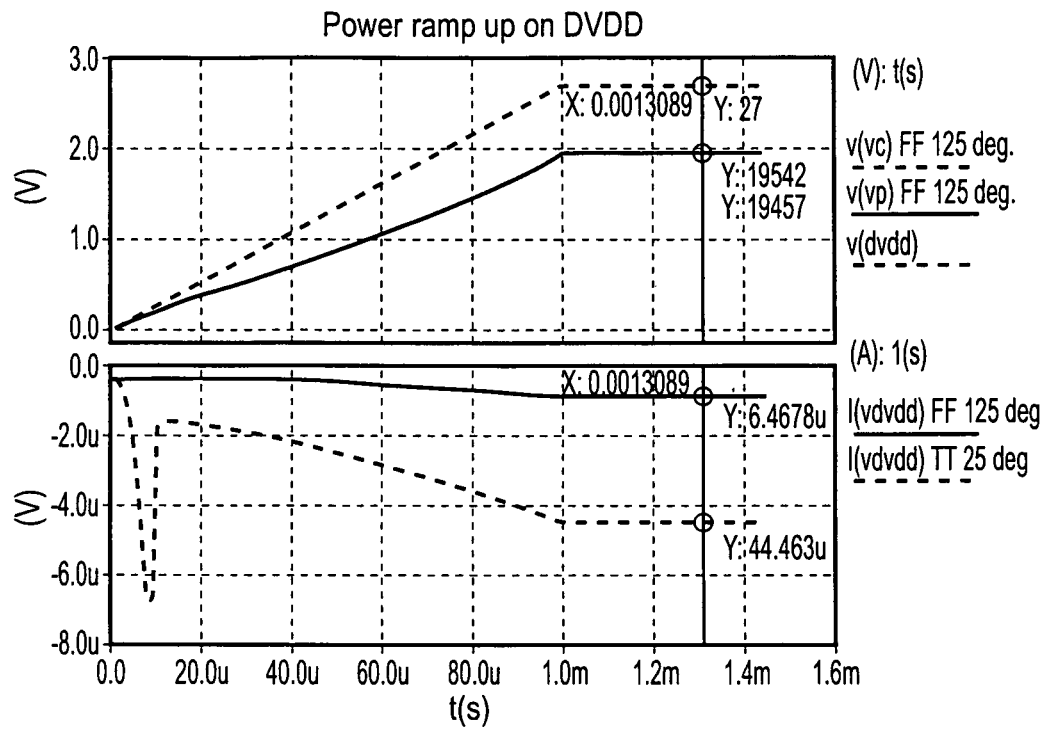
FIG. 5 shows simulation results for normal operation of the apparatus shown in FIG. 4.

The ramp up of the voltage level at node Vc and on the high voltage rail DVDD and the ramp up of the intermediate voltage level Vp is shown in FIG. 5, along with the current flow. As can be seen the timescale for the voltage to ramp up is of the order of milliseconds.

Next the behaviour during an ESD event will be described. The ESD event contains two phases. The first phase occurs during a time period in the order of hundreds of picoseconds to several nanoseconds. During this phase, the ESD protection must react very fast and must be able to absorb the ESD current while only developing a low voltage. During this phase, the capacitor 20 presents very low impedance and $V_C$ node remains at DVSS (0V). During the second phase, the ESD protection structure continues absorbing the current and relaxes with the capacitor 20 becoming loaded through the $R_{ESD}$ resistor.

During the first phase of the ESD event, $V_C=0$ as capacitor 20 is conducting and connects $V_C$ to the ground rail for the very early part of the event. $V_C$ being low keeps $TN_D$ off making the voltage divider 14 not active. The logic part, inverter 28 uses Vc being low to turn the big NMOS 24 on, allowing the big NMOS 24 to absorb most of the ESD current while keeping the resulting voltage as low as possible. The current is also flowing through $TP_D$, $R_{ESD}$ and capacitor 20 which starts loading. Having $V_C \neq V_P$ turns on $TN_B$, whereupon $V_M=V_C$, this turns on $TP_P$ and as $TP_P$ is designed to be much larger than $TP_D$, it takes over the control on the $V_P$ node and pulls it to DVDD. This is a key part of the embodiment; pulling $V_P$ to DVDD reduces current limitation on the Big MOS 22 due to the high $V_{GS}$: the structure thereby uses its maximum or at least near maximum current carrying capability. Furthermore the PMOS transistors within the inverter are also on so they connect $V_T$ to $V_P$ so that big MOS 24 sees the high $V_{GS}$ too.

Figure 6:
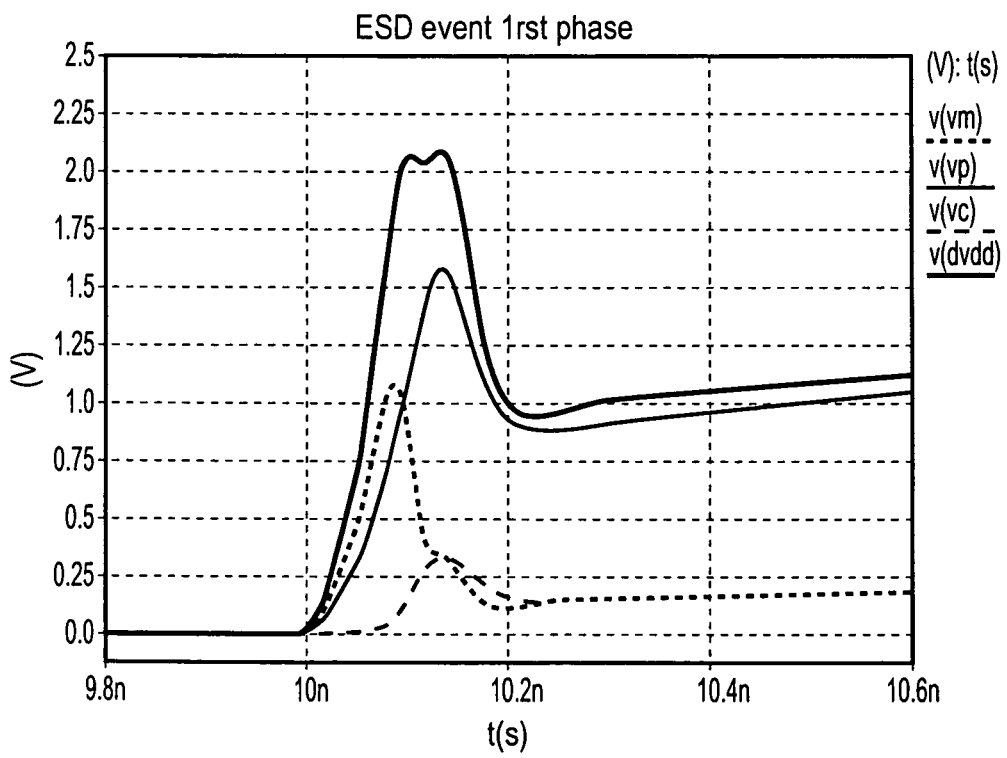
FIG. 6 shows simulation results for an electrostatic discharge event first phase in the apparatus of FIG. 4.

FIGS. 5 and 6 illustrate the $1^{st}$ and $2^{nd}$ phases of an ESD event that has been simulated using a transmission line pulse to generate a current injection with an amplitude of 2 A, a rise time of 2 ns and a pulse duration higher than 100 ns.

FIG. 6 illustrates the $1^{st}$ phase of this ESD event. As can be seen the voltage rises very quickly within nanoseconds to a level above 2 Volts on the high voltage rail and retains this level very briefly before falling to levels around 1 Volt, it then climbs slowly during the second phase of the ESD event, where the circuit has conventional behaviour. It also rises quickly to lower levels at node Vp and node Vm.

Figure 7:
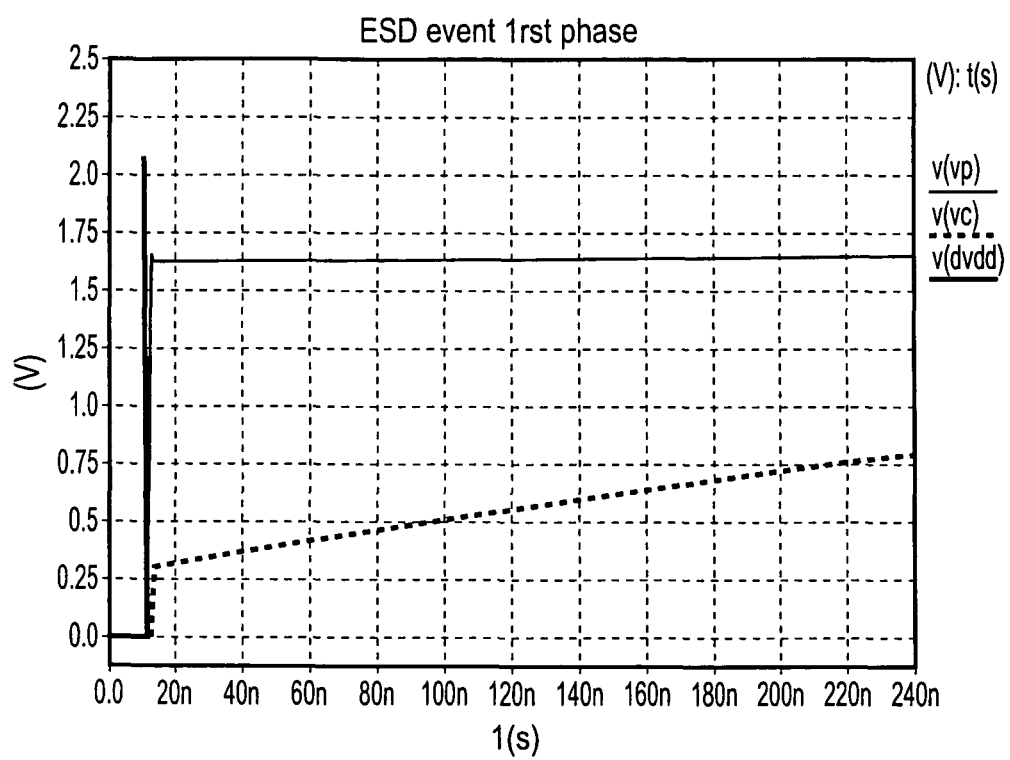
FIG. 7 shows simulation results for an electrostatic discharge event second phase in the apparatus shown in FIG. 4.

During this first phase the capacitor 20 will start loading, and when it reaches the threshold voltage of inverter 28, the Big NMOS 24 will turn off. As is commonly done in this kind of circuit, the RC constant of the circuit is designed to leave low enough remaining ESD current to be safely dissipated through the chip leakage when the big NMOS 24 is turned off. If the event lasts longer, the $V_C$ node will continue to increase in voltage and when reaching the $V_P$ node voltage, $TN_B$ and $TP_P$ will turn off and the voltage divider will take over the control on $V_P$. This last mechanism has no negative effect on the ESD performance of the overall structure since the big NMOS 22 is already OFF and any dangerous ESD current already dissipated. The loading of the capacitance is depicted in FIG. 7.

As can be seen from a comparison of FIGS. 5 and 6, the timescales for the voltage changes in response to a device turning on are much longer of the order of microseconds, compared to the voltage changes occurring in response to an ESD event which are of the order of pico- and nano-seconds. Thus, a device that has an appropriate RC value and is therefore sensitive to these faster changes can be used to switch the input voltage level between the voltage level of a voltage rail and the intermediate voltage level in response to the fast changes and yet will not switch in response to changes in voltage levels that occur through a device ramping up on power on for example. In effect the design exploits the difference of time domain (rise time related) that applies to normal operation compared to any ESD event.

Figure 8:
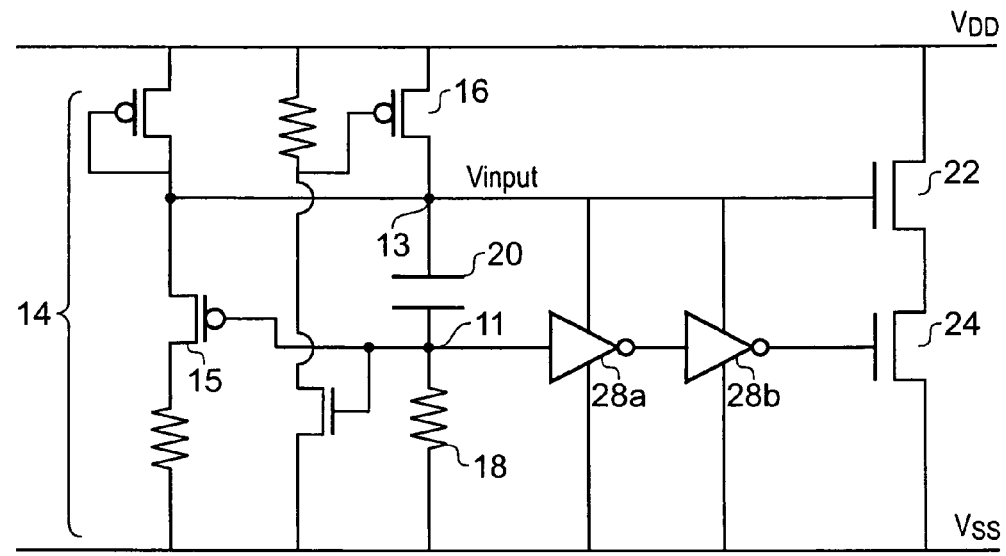
FIG. 8 shows an alternative embodiment of an electrostatic discharge protection apparatus according to an embodiment of the present invention.

FIG. 8 shows an alternative embodiment where the resistor 18 and capacitor 20 of the apparatus shown in FIGS. 3 and 4 have been reversed. In this case the internal node 11 is pulled toward VDD in response to the ESD event and thus if NMOS discharge devices 22, 24 are used two inverters 28a, 28b are required such that the high level signal that occurs in response to the ESD event is input to the gate of discharge device 24.

This apparatus operates in much the same way as the apparatus of FIG. 4 except that during steady state operation the capacitor 20 is not conducting and the internal node 11 is held close to VSS. This means that discharge device 24 is turned off. In response to a discharge event the capacitor 20 starts to conduct the internal mode 11 rises and discharge device 24 is switched on. Switch 15 is switched off turning the voltage divider 14 off and switch 16 is switched on which connects the node 13 supplying the voltage $V_{input}$ to the high voltage rail VDD and switches discharge device 22 and discharge device 24 fully on.

Figure 9:
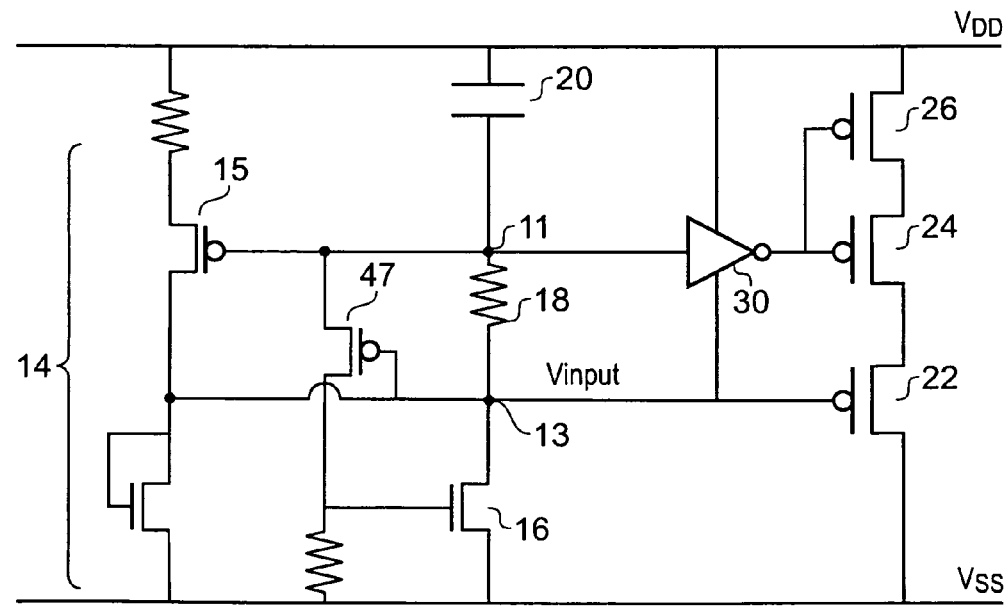
FIG. 9 shows an embodiment of an electrostatic discharge protection apparatus where the discharge devices are formed of PMOS devices rather than NMOS devices.

FIG. 9 shows an alternative embodiment of the present invention where there are three discharge devices 22, 24 and 26 and they are PMOS devices. It should be appreciated that the number of discharge devices can be increased and it is convenient if their control nodes are connected together such that they switch at the same time. In this embodiment, as PMOS devices form the discharge devices then a low voltage input will switch them on and thus, in response to an electrostatic discharge event it is convenient if the input voltage that is output by the voltage divider 14 is switched via switch 16 to the low voltage rail. At this point switch 15 is also switched off to switch the voltage divider off. In this embodiment, the capacitor 20 raises the voltage of the internal node to VDD in response to an electrostatic discharge event and this controls the switches such that switch 15 is switched off and switch 16 is switched on. There is also an additional switch 17 that corresponds to switch $TN_b$ of FIG. 4. Thus, in response to an electrostatic discharge event all of the PMOS discharge devices 22, 24 and 26 are switched on and the rapidly increasing incoming current can be dissipated.

During normal steady state operation, capacitor 20 becomes charged and does not conduct, thus, node 11 falls to a low voltage level and inverter 30 outputs a high voltage level and transistors 24 and 2 are switched off. At this time switch 15 is switched on in response to the falling voltage at node 11 which activates voltage divider 14 which supplies an intermediate voltage to node 13, and switch 16 is switched off isolating VSS from node 13. Thus, the component devices of the ESD are protected by this intermediate voltage during steady state operation and do not see the full voltage drop of the voltage rails.

Figure 10:
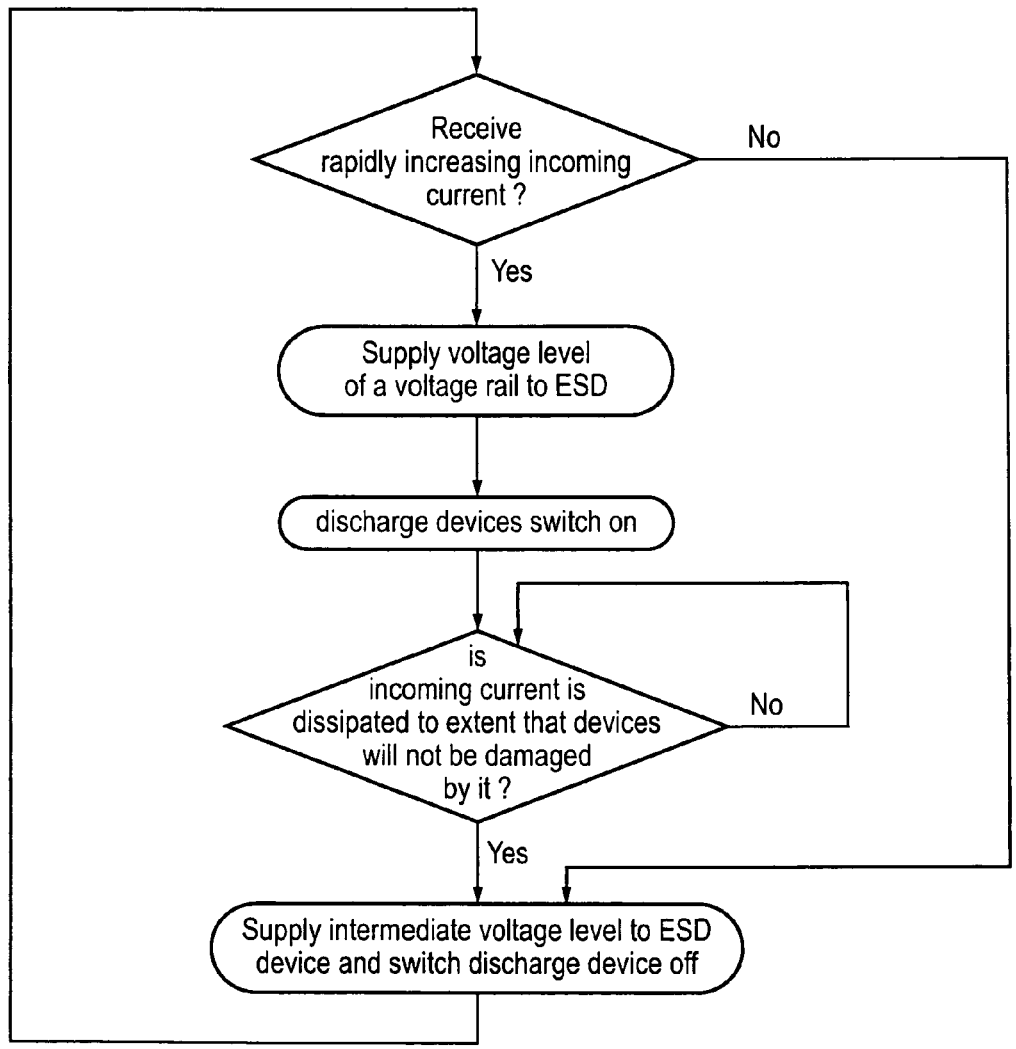
FIG. 10 shows a flow diagram illustrating steps in a method according to an embodiment of the present invention.

FIG. 10 shows a flow diagram illustrating steps in a method according to an embodiment of the present invention. First it is determined if a rapidly increasing incoming current has been received. If it has a voltage level of a voltage rail is supplied to the electrostatic discharge protection device, the discharge devices switches on in response to this and the incoming current is dissipated.

It is then determined at what point the incoming current has been dissipated to an extent that the components of the semiconductor electronic device protected by the ESD will not be damaged by it. When it is determined that it has been dissipated to that extent then the intermediate voltage level is supplied to the ESD device rather than the voltage level of a voltage rail and the discharge device is switched off.

The method then continues to monitor whether or not a rapidly increasing incoming current has been received. While no ESD event is detected then the intermediate voltage level is supplied to the ESD device and the discharge devices do not form a discharge path.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. An electrostatic protection apparatus comprising:
a voltage level supply configured to supply a voltage level to an electrostatic discharge protection device and said electrostatic discharge protection device for protecting a semiconductor electronic device from a rapidly increasing incoming current, said voltage level supply comprising:
a voltage divider arranged between high and low voltage rails for supplying an intermediate voltage level between said high and low voltage levels to said electrostatic discharge protection device such that a voltage drop across at least some devices within said electrostatic discharge protection device is limited by said intermediate voltage level;
a detection device for detecting a signal received from said electrostatic discharge protection device indicating said electrostatic discharge protection device has received said rapidly increasing incoming current;
a switching device responsive to said signal to switch said voltage level supplied to said electrostatic discharge protection device from said intermediate voltage level to a voltage level of one of said voltage rails.

2. An electrostatic protection apparatus according to claim 1, wherein said detection device is configured to detect a further signal received from said electrostatic discharge protection device indicating that said rapidly increasing incoming current has been dissipated to an extent such that said incoming current is no longer high enough to damage devices within said semiconductor electronic device;
said switching device being responsive to said further signal to switch said voltage level supplied to said electrostatic discharge protection device from said voltage level of said one of said voltage rails to said intermediate voltage level.

3. An electrostatic protection apparatus according to claim 2, wherein said voltage divider comprises a voltage divider switch providing a low resistance path when switched on and a high resistance path when switched off, said voltage divider switch being configured to switch off in response to said detection device detecting receipt of said signal and to switch on in response to said detection device detecting receipt of said further signal.

4. An electrostatic discharge protection apparatus according to claim 1, wherein said electrostatic discharge protection device is responsive to said rapidly increasing incoming current to protect said semiconductor electronic device by providing a low resistance path between a high voltage rail and a low voltage rail to thereby dissipate said incoming current, said electrostatic discharge protection device comprising:
two discharge devices arranged in series between said high voltage rail and said low voltage rail, said two discharge devices providing said low resistance path when both are switched on and providing a high resistance path when at least one of said two discharge devices is switched off, said two discharge devices each comprising a control node and each being responsive to a voltage at said control node to switch on or off; wherein
said voltage level supply is configured to supply said voltage level to said control node of a first of said two discharge devices.

5. An electrostatic protection apparatus according to claim 4, wherein said two discharge devices are arranged such that in response to said voltage level supply supplying said voltage level of said one of said voltage rails to said control node of said first discharge device, said control node of said second discharge device is connected to said control node of said first discharge device, such that said control nodes of said two discharge devices receive said voltage level from said one of said voltage rails and said two discharge devices are switched on.

6. An electrostatic protection apparatus according to claim 5, wherein said two discharge devices are arranged such that in response to said voltage level supply supplying said intermediate voltage level to said control node of said first discharge device, said second discharge device receives a voltage level close to a voltage level of an other voltage rail to said one of said voltage rails and is switched off.

7. An electrostatic discharge protection apparatus according to claim 4, said electrostatic discharge protection device comprising at least one further discharge device arranged in series with said two discharge devices, said at least one further discharge device having a control node connected to a control node of said first or said second discharge device.

8. An electrostatic protection apparatus according to claim 1, wherein said electrostatic discharge protection device comprises:
a trigger device arranged between a first of said voltage rails and an internal node of said electrostatic discharge protection device, said trigger device providing a high resistance path in response to a steady voltage difference across said trigger device and providing a low resistance path in response to a rapidly changing voltage difference across said trigger device caused by said rapidly changing incoming current, such that in response to said rapidly changing voltage difference said internal node attains a voltage level close to said voltage level of said first voltage rail, said detecting device detecting said voltage level of said internal node attaining a voltage level close to said voltage level of said first voltage rail as said signal.

9. An electrostatic discharge protection apparatus according to claim 8, wherein said internal node is connected via a resistor to a second of said voltage rails, wherein in response to said rapidly changing voltage level attaining a steadier value, a resistance of said trigger device rises, and said voltage level of said internal node moves towards a voltage level of said second of said voltage rails;
said detecting device being configured to detect said voltage level of said internal node changing from said voltage level close to said voltage level of said first voltage rail towards a voltage level of said second voltage rail as a further signal and in response to said further signal said switching device is configured to switch said voltage level supplied to said electrostatic discharge protection device from said high voltage rail to said intermediate voltage level; and
wherein said trigger device, resistor and said switching device lie between said two voltage rails, said switching device switching off in response to said further signal such that said trigger device and said resistor are isolated from said one of said voltage rails.

10. An electrostatic protection device according to claim 9, wherein said electrostatic discharge protection device is responsive to a rapidly increasing incoming current to protect said semiconductor electronic device by providing a low resistance path between a high voltage rail and a low voltage rail to thereby dissipate said incoming current, said electrostatic discharge protection device comprising:
two discharge devices arranged in series between said high voltage rail and said low voltage rail, said two discharge devices providing said low resistance path when both are switched on and providing a high resistance path when at least one of said two discharge devices is switched off, said two discharge devices each comprising a control node and each being responsive to a voltage at said control node to switch on or off; wherein
said voltage level supply is configured to supply said voltage level to said control node of a first of said two discharge devices; and
said second discharge device is responsive to a voltage level at said internal node and in response to said voltage level moving towards a voltage level of said second voltage rail said second of said two discharge devices is configured to switch off.

11. An electrostatic discharge protection apparatus according to claim 10, wherein said two discharge devices are NMOS transistors, said first voltage rail is said low voltage rail and said one of said voltage rails and said second voltage rail are said high voltage rail and said control node of said second discharge device is connected to said internal node via an inverting device.

12. An electrostatic discharge protection apparatus according to claim 10, wherein said inverting device is powered between said voltage level supplied from said voltage level supply and said low voltage rail.

13. An electrostatic discharge protection apparatus according to claim 8, wherein said inverting device comprises a switching device between said control node of said first discharge device and a control node of said second discharge device, said switching device being responsive to said internal node attaining a voltage level close to said voltage level of said first voltage rail to switch on and connect said two control nodes to each other.

14. An electrostatic discharge protection apparatus according to claim 8, wherein said trigger device comprises a capacitor.

15. An electrostatic discharge protection device according to claim 10, wherein said two discharge devices are PMOS transistors, said first voltage rail is said high voltage rail, said second voltage rail is said low voltage rail and said one of said voltage rails is said low voltage rail.

16. A method of supplying a voltage level to an electrostatic discharge protection device for protecting a semiconductor electronic device powered by voltage rails at respective high and low voltage levels from a rapidly increasing incoming current, said method comprising:
supplying an intermediate voltage level between a high and low voltage level to said electrostatic discharge protection device such that a voltage drop across at least some devices within said electrostatic discharge protection device is limited by said intermediate voltage level;
detecting a signal received from said electrostatic discharge protection device indicating said electrostatic discharge protection device has received said rapidly increasing incoming current;
switching said voltage level supplied to said electrostatic discharge protection device from said intermediate voltage level to a voltage level of one of said voltage rails.

17. A method according to claim 16, comprising a further step of:
detecting a further signal received from said electrostatic discharge protection device indicating that said rapidly increasing incoming current has been dissipated to an extent such that said incoming current is no longer high enough to damage devices within said semiconductor electronic device; and
switching said voltage level supplied to said electrostatic discharge protection device from said voltage level of said one of said voltage rails to said intermediate voltage level.

18. A method according to claim 16, wherein said electrostatic discharge protection device is responsive to said rapidly increasing incoming current to protect said semiconductor electronic device by providing a low resistance path between a high voltage rail and a low voltage rail to thereby dissipate said incoming current, said electrostatic discharge protection device comprising two discharge devices that provide said low resistance path when both are switched on and provide a high resistance path when at least one of said two discharge devices is switched off, said two discharge devices each comprising a control node and each being responsive to a voltage at said control node to switch on or off, said voltage level being supplied to a control node of a first of said two discharge devices, said method comprising a further step of:

in response to said signal connecting said control node of said first discharge device to said control node of a second discharge device such that said control nodes of said two discharge devices are connected to said voltage level of said one of said voltage rails and said two discharge devices switch on.

19. A method according to claim 18, comprising a further step of in response to said voltage level supply supplying said intermediate voltage level to said electrostatic discharge protection device, switching said second discharge device off by transmitting a voltage level close to a voltage level of an other voltage rail to said one of said voltage rails to a control node of said second discharge device.

20. An electrostatic protection apparatus comprising:

a voltage level supply means for supplying a voltage level to an electrostatic discharge protection means and said electrostatic discharge protection means for protecting a semiconductor electronic device from a rapidly increasing incoming current, said voltage level supply means comprising:

a voltage dividing means arranged between high and low voltage rails for supplying an intermediate voltage level between said high and low voltage levels to said electrostatic discharge protection means such that a voltage drop across at least some devices within said electrostatic discharge protection means is limited by said intermediate voltage level;

a detection means for detecting a signal received from said electrostatic discharge protection means indicating said electrostatic discharge protection means has received said rapidly increasing incoming current;

a switching means responsive to said signal for switching said voltage level supplied to said electrostatic discharge protection means from said intermediate voltage level to a voltage level of one of said voltage rails.

* * * * *